(12) United States Patent
Furukawa et al.

(10) Patent No.: US 6,392,380 B2
(45) Date of Patent: May 21, 2002

(54) HYBRID CAR POWER SUPPLY APPARATUS

(75) Inventors: Tadashi Furukawa, deceased, late of Hyogo; Shoichi Toya, Hyogo, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/770,650

(22) Filed: Jan. 29, 2001

(30) Foreign Application Priority Data

Jan. 31, 2000 (JP) ........................................ 2000-021425

(51) Int. Cl.[7] .................................................. H02J 7/00
(52) U.S. Cl. ........................................ 320/104; 320/103
(58) Field of Search ................................ 320/104, 103; 307/46, 64, 66; 180/65.1, 65.2, 65.3

(56) References Cited

U.S. PATENT DOCUMENTS 5,934,396 A * 8/1999 Kurita ....................... 180/65.2

6,232,743 B1 * 5/2001 Nakanishi ................... 320/104

* cited by examiner

Primary Examiner—Jessica Han
Assistant Examiner—Lawrence Luk
(74) Attorney, Agent, or Firm—Wenderoth, Lind & Ponack, L.L.P.

(57) ABSTRACT

The hybrid car power supply apparatus is provided with a battery system having a driving battery to run an electric motor to drive the vehicle, an inverter to drive the electric motor with the driving battery, and an automotive battery. The battery system houses a charging circuit to charge the driving battery with the automotive battery. The charging circuit charges the driving battery with the automotive battery when remaining driving battery capacity becomes low. The charged driving battery runs the electric motor to start the engine.

38 Claims, 1 Drawing Sheet

HYBRID CAR POWER SUPPLY APPARATUS

This application is based on application No. 021425 filed in Japan on Jan. 31, 2000, the content of which incorporated hereinto by reference.

BACKGROUND OF THE INVENTION

This invention relates to a power supply apparatus to drive a hybrid car.

A hybrid car runs by driving wheels with an engine and an electric motor. A driving battery is installed as the power source to drive the electric motor. This driving battery is charged by a generator. The generator is driven by the engine or by regenerative braking which uses inertial force to drive the generator when the automobile is stopping. The amount of charge and discharge for the driving battery is controlled by a battery control circuit, and the remaining battery capacity is regulated within a specified range. This is because over-charging and over-discharging cause rapid degradation in the electrical characteristics of the driving battery. The battery control circuit, which controls charging and discharging of the driving battery is contained along with the driving battery within the battery system.

In this power supply apparatus, over-discharge of the driving battery will not occur as long as the automobile is operated under normal conditions. However, if the vehicle is not used for a long period, the driving battery may discharge and not be able to drive the electric motor. Since the electric motor which drives the wheels of a hybrid car serves a dual purpose as starter motor for the engine, the engine cannot be started if the driving battery is discharged.

This situation can be corrected by charging the driving battery from an external source. However, since the driving battery contains more than 1000 rechargeable batteries to attain a substantially high voltage, it is necessary to charge the driving battery with a special-purpose battery charger. Inability to drive the vehicle due to discharge of the driving battery is an extremely rare event. Therefore, it is impossible from a practical standpoint to provide a special-purpose battery charger to correct this rare event.

This dilemma can be solved by starting the engine with an automotive electrical system battery. However, since the output voltage of automotive electrical system batteries is almost without exception 12V, either a special starter motor must be used to start the engine, or an inverter is necessary to raise the voltage from 12V DC to the voltage of the electric driving motor. In providing a starter motor, it is necessary to equip the engine with a starter motor which is almost never used, and increase manufacturing cost. In providing an inverter, it is necessary to make, inverter output extremely high, and this also has the drawback of excessively high manufacturing cost.

The present invention was developed to resolve these types of problems. Thus it is a primary object of the present invention to provide a hybrid car power supply apparatus which can charge the driving battery with an automotive electrical system battery and a low cost system, and which can start the engine when the driving battery has been over-discharged.

The above and further objects and features of the invention will more fully be apparent from the following detailed description with accompanying drawings.

SUMMARY OF THE INVENTION

The hybrid car power supply apparatus of the present invention is provided with a battery system, an inverter to supply power output from a driving battery inside the battery system to the electric motor, and an automotive battery used as power source for standard automobile electrical equipment. The battery system is provided with a driving battery for powering the vehicle driving motor and a battery control circuit to control charging and discharging of the driving battery. Further, the battery system contains a charging circuit for charging the driving battery with the automotive electrical system battery. When the remaining battery capacity of the driving battery drops below a set value, the charging circuit charges the driving battery with power from the automotive electrical system battery. The charged driving battery drives the electric motor to start the engine.

The hybrid car power supply apparatus described above has the characteristic that a low cost system allows the vehicle to be started when the driving battery has been over-discharged. This is because the battery system which houses the driving battery also contains a charging circuit. This charging circuit charges the driving battery via the automotive electrical system battery. Namely, the charging circuit within the battery system charges the driving battery with power from the automotive battery and the charged driving battery operates the electric motor to start the engine. This configuration has the characteristic that the charging circuit can be made at low cost and with high reliability. This is because the driving battery can be charged by the automotive battery over a given length of time. Therefore, charging circuit output current can be relatively small and still charge the driving battery to operate the electric motor.

When remaining driving battery capacity becomes low, the electric motor could alternatively be directly powered by the automotive battery to start the engine without relying on the system above. However, in this case, an extremely high output special-purpose inverter is required to drive the electric motor with the automotive battery. Since extremely high current must flow at the instant the electric motor is turned over, this inverter must be designed for high power output and becomes an expensive item.

However, the inverter provided in the hybrid car for running the electric motor via the driving battery can be used to avoid driving the electric motor directly with the automotive battery. This is possible by charging the driving battery with the automotive battery and running the electric motor via the driving battery. A charging circuit to charge the driving battery from the automotive battery is required, but it is not necessary to instantaneously charge the driving battery and the charging circuit can be a low current, low cost device. Further, since there is no high current flow over short periods, reliability is improved, operating life extended, and maintenance simplified.

This system has the characteristic that simply by connecting an automotive battery to the hybrid car, the driving battery can be charged and the engine started by the electric motor even when remaining battery capacity becomes low. This is because the battery system is equipped with a charging circuit to charge the driving battery via the automotive battery.

In this battery system, it is preferable to detect remaining battery capacity of the driving battery and the automotive battery via the battery control circuit. When remaining driving battery capacity drops below a specified level, and remaining automotive battery capacity is above a specified level, the automotive battery charges the driving battery.

In addition, the battery system charging circuit can also house a circuit to charge the automotive battery from the driving battery. In this battery system, the battery control circuit detects remaining battery capacity of the driving battery and automotive battery. When remaining driving battery capacity is above a specified level, and remaining automotive battery capacity is below a specified level, the driving battery charges the automotive battery.

Since the driving battery of this power supply apparatus can charge the automotive battery, power from the driving battery taken during forced discharge of the driving battery can be efficiently used to charge the automotive battery. The driving battery is actually many rechargeable batteries connected together. Therefore, the driving battery has the property that battery capacity differences between individual batteries become large through repeated charge-discharge cycles, upsetting the balance of battery capacities. If a driving battery having rechargeable batteries with unbalanced capacities is charged and discharged, some battery may over-charge or some battery may over-discharge. Further, to extend driving battery life as much as possible, shallow charging and discharging is repeatedly performed. As a result, depending on battery type, effective usable battery capacity can decrease due to the "memory effect". A driving battery in these conditions can be forcibly discharged to recover from battery capacity imbalance and "memory effect". At these times, if discharge power is used to charge the automotive battery, driving battery discharge is not wasted and the automotive battery can be efficiently charged.

Further, the battery system can be provided with a driving battery cooling fan powered by the automotive battery to avoid driving battery over-heating. Still further, the automotive battery can also be used as back-up power for the battery control circuit.

DETAILED DESCRIPTION OF THE INVENTION

Figure 1:
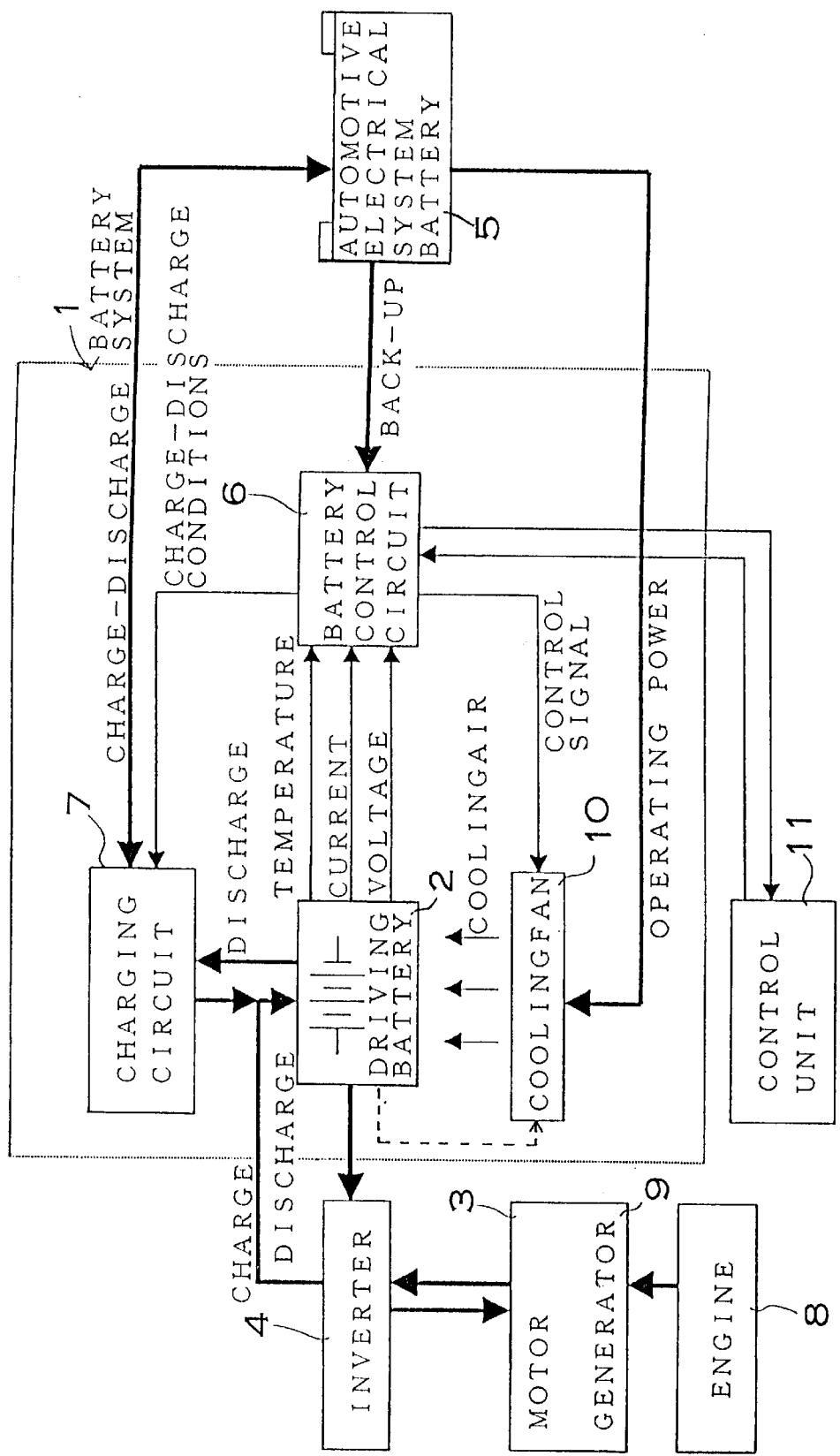
FIG. 1 is a block diagram showing an embodiment of the hybrid car power supply apparatus of the present invention.

The hybrid car power supply apparatus of FIG. 1 is provided with a battery system 1 equipped with a driving battery 2 to run an electric motor 3 to drive the vehicle, an inverter 4 to supply output from the driving battery 2 contained in the battery system 1 to the electric motor 3, and an automotive electrical system battery 5 used as a power source for automobile electrical equipment.

The battery system 1 is provided with a driving battery 2, a battery control circuit 6 to charge and discharge the driving battery 2 while avoiding over-charge and over-discharge, a charging circuit 7 to charge the driving battery 2 via the automotive electrical system battery 5, and a driving battery 2 cooling fan 10.

The driving battery 2 comprises many battery modules connected in series. A battery module contains one or a plurality of rechargeable batteries. The rechargeable batteries of a battery module are nickel-cadmium batteries, nickel-hydrogen batteries, or lithium-ion rechargeable batteries.

The battery control circuit 6 detects driving battery 2 voltage, current flow, and temperature. Battery temperature is detected by temperature sensors. Temperature sensors are provided either in close proximity to each battery module or in contact with each battery module. Battery current flow is detected by amplifying the voltage generated across a current detecting resistor (not illustrated) in series with the battery. Since the positive/negative polarity of the voltage generated across the current detecting resistor is opposite for charging and discharging, charging and discharging can be distinguished by the positive/negative polarity of the voltage. For a driving battery 2 comprising a plurality of rechargeable batteries connected in series, the voltage and temperature is detected independently for each rechargeable battery. Otherwise, voltage and temperature is detected for a battery module taken as one unit comprising a plurality of rechargeable batteries connected in series.

The battery control circuit 6 subtracts discharged capacity from charged capacity to compute remaining battery capacity of the driving battery 2. Charged capacity is computed by taking the product of charging efficiency and integrated charging current. Discharged capacity can be computed from the integrated discharge current. The battery control circuit 6 is controlled by the automobile control unit 11. The battery control circuit 6 controls charging and discharging to keep the remaining battery capacity of the driving battery 2 within a specified range.

Further, the battery control circuit 6 detects the voltage of the automotive electrical system battery 5 and determines the remaining battery capacity of the automotive battery 5. The remaining battery capacity of the automotive battery 5 is not determined from the difference between charge and discharge capacities, but rather is determined from the battery voltage. When the voltage of the automotive battery 5 drops below a set voltage, remaining battery capacity is judged to be smaller than a prescribed value.

The battery control circuit 6 uses power supplied by the driving battery 2 with voltage stepped down via an inverter (not illustrated) as a power source. However, if the remaining battery capacity of the driving battery 2 drops below a prescribed value, power from the driving battery 2 is suspended and power from the automotive battery 5 is supplied to the battery control circuit 6 as a back-up. In this circuit, the battery control circuit 6 can operate on power supplied from the automotive battery 5 even when remaining driving battery capacity has become low.

The battery control circuit 6 also controls the charging circuit 7 to charge the driving battery 2 with the automotive battery 5 and to charge the automotive battery 5 with the driving battery 2. When remaining battery capacity of the driving battery 2 drops below a prescribed value and the driving battery 2 can no longer turn the electric motor 3 to start the engine 8, the battery control circuit 6 uses the charging circuit 7 to charge the driving battery 2 with the automotive battery 5. The capacity to which the driving battery 2 is charged at this time is that necessary to run the electric motor 3 and start the engine 8. Consequently, when the remaining battery capacity of the driving battery 2 reaches a capacity capable of starting the engine 8, charging of the driving battery 2 is suspended. Further, when remaining automotive battery 5 capacity becomes low, and remaining driving battery 2 capacity is greater than a prescribed value, the driving battery 2 charges the automotive battery 5 until driving battery 2 voltage and remaining battery capacity reach prescribed values.

The charging circuit 7 converts voltage to allow the automotive battery 5 to charge the driving battery 2. Compared to the automotive battery 5, the driving battery 2 is a higher voltage battery. Consequently, the charging circuit 7 contains a voltage step-up inverter to increase the DC voltage of the automotive battery 5 to a DC voltage capable of charging the driving battery 2.

It is preferable for the charging circuit 7 to be capable of quickly charging the driving battery 2. However, it is not necessary to charge the driving battery 2 in the short period typical of starting an engine with a starting motor in a standard automobile, for example, in several seconds. Charging circuit charging current must be increased to shorten charging time. Further, if an automotive battery is discharged with large current over a very short time interval, its actual output capacity decreases. To efficiently charge the driving battery with automotive battery output, it is advantageous to set the charging circuit output current low.

Charging circuit 7 output current is set to an optimum value considering the timing involved in charging the driving battery with the automotive battery. In a power supply apparatus which begins charging the driving battery with the automotive battery when the automobile ignition switch is turned on, charging circuit output current is made high. This is because the engine is started after waiting for the driving battery to charge. In this type of system, when the ignition switch is turned on and it is detected that the remaining driving battery capacity is below the prescribed value and the electric motor cannot be turned over, charging of the driving battery from the automotive battery is started. When the driving battery has been charged enough to start the engine with the electric motor, charging is suspended, the electric motor is operated with the driving battery, and the engine is started.

In this type of system, the electric motor is not operated from the time the ignition switch is turned on until the driving battery is charged. Since the driver is required to wait during that period, charging circuit output current is increased to shorten the charging time. However, the time to charge the driving battery with the automotive battery is set considerably longer than the time for a starter motor to start an engine. In this type of system, when the ignition switch is off, even if remaining driving battery capacity drops below the prescribed value, the automotive battery does not charge the driving battery.

In contrast, in a system which charges the driving battery with the automotive battery when remaining driving battery capacity drops below the prescribed value even when the ignition switch is off, charging circuit output current can be made extremely small. Even if it takes some time to charge the driving battery, the driver is not required to wait for the engine to start. Consequently, this type of system has the characteristic that the driving battery can be charged with a charging circuit having an extremely small output current.

Further, the charging circuit 7 contains a circuit to convert driving battery 2 output to a voltage for charging the automotive battery 5. For example, when automotive electrical equipment is used and remaining automotive battery 5 capacity becomes low, the charging circuit 7 charges the automotive battery 5 with the driving battery 2. The circuit for charging the automotive battery 5 with the driving battery 2 is an inverter which steps down driving battery 2 voltage to the charging voltage of the automotive battery 5. This system has the characteristic that it can charge the automotive battery 5 much more efficiently than an alternator installed in a standard automobile. This is because the charging circuit 7 can charge the automotive battery 5 extremely efficiently compared to an alternator.

In a standard automobile, a dedicated alternator is turned by a belt connected to the engine crankshaft to charge the automotive battery. Since this system charges the automotive battery with a high output alternator, charging efficiency is extremely low. At low output levels, alternator efficiency drops remarkably.

A cooling fan 10 cools the driving battery 2 with controlled air flow when driving battery 2 temperature becomes abnormally high. Consequently, the battery control circuit 6 controls operation of the cooling fan 10. The cooling fan 10 is supplied power from the automotive battery 5. This cooling fan 10 can use an off-the-shelf motor operated by the automotive battery 5. However, the cooling fan 10 can also be driven by the driving battery 2.

The inverter 4 converts DC power from the driving battery 2 to, for example, three-phase alternating current (AC) to drive the electric motor 3 with the driving battery 2. In addition, the inverter 4 converts power from the generator 9 to DC at the driving battery charging voltage to charge the driving battery 2 with the generator 9. Therefore, the inverter 4 is connected between the driving battery 2 and the electric motor 3 and is also connected between the generator 9 and the driving battery 2.

The automotive battery 5 is a 12V lead storage battery. However, in the present invention, the automotive battery is not limited to this type of battery and, for example, a battery with an output voltage of 24V, or a rechargeable battery other than a lead storage battery can be used. Regardless of what type of battery is used, there is no requirement for the automotive battery 5 to output very high power. Therefore, a battery with considerably lower output voltage than the driving battery 2 is used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A hybrid car power supply apparatus, for use with a hybrid car having an electric motor for driving the hybrid car and having electrical equipment, said hybrid car power supply apparatus comprising:
   an automotive battery for supplying power to the electrical equipment of the hybrid car;
   a battery system comprising
      a driving battery to be connected to the electric motor of the hybrid car for driving the hybrid car,
      a battery control circuit operable to control charging and discharging of said driving battery,
      a charging control circuit operable to charge said driving battery with power from said automotive battery when a remaining battery capacity of said driving battery drops below a first specified value; and
   an inverter operable to supply the electric motor of the hybrid car with output from said driving battery of said battery system.

2. A hybrid car power supply apparatus as recited in claim 1, wherein said charging control circuit is operable to compute the remaining battery capacity of said driving battery by subtracting discharged capacity from charged capacity.

3. A hybrid car power supply apparatus as recited in claim 1, wherein said charging control circuit is operable to determine a remaining battery capacity of said automotive battery by detecting a battery voltage of said automotive battery.

4. A hybrid car power supply apparatus as recited in claim 1, said charging control circuit obtaining operating power from said driving battery, wherein, in obtaining operating power, said charging control circuit is operable to step down a voltage of said driving battery.

5. A hybrid car power supply apparatus as recited in claim 4, wherein said charging control circuit comprises an inverter operable to step down the voltage of said driving battery in obtaining operating power from said driving battery.

6. A hybrid car power supply apparatus as recited in claim 1, wherein said charging control circuit is operable to suspend supply of power from said driving battery and to supply power from said automotive battery to the electric motor of the hybrid car when the remaining battery capacity of said driving battery drops below a second specified value.

7. A hybrid car power supply apparatus as recited in claim 1, wherein said battery control circuit of said battery system is operable to detect the remaining battery capacity of said driving battery and a remaining battery capacity of said automotive battery, and to charge said driving battery with said automotive battery when the remaining battery capacity of said driving battery is below a second specified value and the remaining battery capacity of said automotive battery is greater than a third specified value.

8. A hybrid car power supply apparatus as recited in claim 1, wherein said charging control circuit of said battery system comprises a circuit operable to charge said automotive battery with said driving battery.

9. A hybrid car power supply apparatus as recited in claim 8, wherein said battery control circuit of said battery system is operable to detect the remaining battery capacity of said driving battery and a remaining battery capacity of said automotive battery, and to charge said automotive battery with said driving battery when the remaining battery capacity of said driving battery is greater than a second specified value and the remaining battery capacity of said automotive battery is below a third specified value.

10. A hybrid car power supply apparatus as recited in claim 1, wherein the hybrid car with which said power supply apparatus is used further comprises an engine, and said battery control circuit is operable to charge said driving battery with said automotive battery via said charging control circuit when the remaining battery capacity of said driving battery drops below a second specified value and said driving battery cannot turn over the electric motor of the hybrid car and start the engine of the hybrid car.

11. A hybrid car power supply apparatus as recited in claim 10, wherein said battery control circuit is operable to charge said driving battery with said automotive battery to a capacity allowing said driving battery to run the electric motor and start the engine of the hybrid car.

12. A hybrid car power supply apparatus as recited in claim 1, wherein said automotive battery outputs a DC voltage, and said charging control circuit includes an inverter circuit operable to step up the DC voltage of said automotive battery to a DC voltage capable of charging said driving battery.

13. A hybrid car power supply apparatus as recited in claim 1, wherein the hybrid car with which said power supply apparatus us used further comprises an ignition switch, and said charging control circuit is operable to begin charging said driving battery with said automotive battery when the ignition switch is turned on.

14. A hybrid car power supply apparatus as recited in claim 13, wherein the hybrid car with which said power supply apparatus is used further comprises an engine, and said charging control circuit is operable to suspend charging when said driving battery has been charged enough to start the engine with the electric motor.

15. A hybrid car power supply apparatus as recited in claim 1, wherein the hybrid car with which said power supply apparatus is used further comprises an ignition switch, and said charging control circuit is operable to charge said driving battery with said automotive battery when the ignition switch is off and the remaining battery capacity of said driving battery drops below a second specified value.

16. A hybrid car power supply apparatus as recited in claim 1, wherein said charging control circuit includes a circuit operable to convert an output of said driving battery to a charging voltage of said automotive battery.

17. A hybrid car power supply apparatus as recited in claim 1, wherein said battery system further comprises a cooling fan for said driving battery, said cooling fan being driven by said automotive battery.

18. A hybrid car power supply apparatus as recited in claim 1, wherein said battery system further comprises a cooling fan for said driving battery, said cooling fan being driven by said diving battery.

19. A hybrid car power supply apparatus, for use with a hybrid car having electrical equipment, said hybrid car power supply apparatus comprising:
   an electric motor for driving the hybrid car;
   an automotive battery for supplying power to the electrical equipment of the hybrid car;
   a battery system comprising
      a driving battery,
      a battery control circuit operable to control charging and discharging of said driving battery,
      a charging control circuit operable to charge said driving battery with power from said automotive battery when a remaining battery capacity of said driving battery drops below a first specified value; and
   an inverter operable to supply said electric motor of the hybrid car with output from said driving battery of said battery system.

20. A hybrid car power supply apparatus as recited in claim 19, further comprising an engine and a generator, wherein said generator is connected between said engine and said driving battery and is operable to charge said driving battery.

21. A hybrid car power supply apparatus as recited in claim 20, wherein said driving motor is operable to start said engine.

22. A hybrid car power supply apparatus as recited in claim 19, wherein said charging control circuit is operable to compute the remaining battery capacity of said driving battery by subtracting discharged capacity from charged capacity.

23. A hybrid car power supply apparatus as recited in claim 19, wherein said charging control circuit is operable to determine a remaining battery capacity of said automotive battery by detecting a battery voltage of said automotive battery.

24. A hybrid car power supply apparatus as recited in claim 19, said charging control circuit obtaining operating power from said driving battery, wherein, in obtaining operating power, said charging control circuit is operable to step down a voltage of said driving battery.

25. A hybrid car power supply apparatus as recited in claim 24, wherein said charging control circuit comprises an inverter operable to step down the voltage of said driving battery in obtaining operating power from said driving battery.

26. A hybrid car power supply apparatus as recited in claim 19, wherein said charging control circuit is operable to suspend supply of power from said driving battery and to supply power from said automotive battery to said electric motor when the remaining battery capacity of said driving battery drops below a second specified value.

27. A hybrid car power supply apparatus as recited in claim 19, wherein said battery control circuit of said battery system is operable to detect the remaining battery capacity of said driving battery and a remaining battery capacity of said automotive battery, and to charge said driving battery with said automotive battery when the remaining battery capacity of said driving battery is below a second specified value and the remaining battery capacity of said automotive battery is greater than a third specified value.

28. A hybrid car power supply apparatus as recited in claim 19, wherein said charging control circuit of said battery system comprises a circuit operable to charge said automotive battery with said driving battery.

29. A hybrid car power supply apparatus as recited in claim 28, wherein said battery control circuit of said battery system is operable to detect the remaining battery capacity of said driving battery and a remaining battery capacity of said automotive battery, and to charge said automotive battery with said driving battery when the remaining battery capacity of said driving battery is greater than a second specified value and the remaining battery capacity of said automotive battery is below a third specified value.

30. A hybrid car power supply apparatus as recited in claim 19, further comprising an engine, wherein said battery control circuit is operable to charge said driving battery with said automotive battery via said charging control circuit when the remaining battery capacity of said driving battery drops below a second specified value and said driving battery cannot turn over said electric motor and start said engine.

31. A hybrid car power supply apparatus as recited in claim 30, wherein said battery control circuit is operable to charge said driving battery with said automotive battery to a capacity allowing said driving battery to run said electric motor and start said engine.

32. A hybrid car power supply apparatus as recited in claim 29, wherein said automotive battery outputs a DC voltage, and said charging control circuit includes an inverter circuit operable to step up the DC voltage of said automotive battery to a DC voltage capable of charging said driving battery.

33. A hybrid car power supply apparatus as recited in claim 19, further comprising an ignition switch, wherein said charging control circuit is operable to begin charging said driving battery with said automotive battery when said ignition switch is turned on.

34. A hybrid car power supply apparatus as recited in claim 33, further comprising an engine, wherein said charging control circuit is operable to suspend charging when said driving battery has been charged enough to start said engine with said electric motor.

35. A hybrid car power supply apparatus as recited in claim 19, further comprising an ignition switch, wherein said charging control circuit is operable to charge said driving battery with said automotive battery when said ignition switch is off and the remaining battery capacity of said driving battery drops below a second specified value.

36. A hybrid car power supply apparatus as recited in claim 19, wherein said charging control circuit includes a circuit operable to convert an output of said driving battery to a charging voltage of said automotive battery.

37. A hybrid car power supply apparatus as recited in claim 19, wherein said battery system further comprises a cooling fan for said driving battery, said cooling fan being driven by said automotive battery.

38. A hybrid car power supply apparatus as recited in claim 19, wherein said battery system further comprises a cooling fan for said driving battery, said cooling fan being driven by said driving battery.

* * * * *